(12) United States Patent
Bergeron et al.

(10) Patent No.: US 11,002,185 B2
(45) Date of Patent: May 11, 2021

(54) COMPOUNDED INTERNAL COMBUSTION ENGINE

(71) Applicant: PRATT & WHITNEY CANADA CORP., Longueuil (CA)

(72) Inventors: Sebastien Bergeron, Chambly (CA); Andre Julien, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/366,116

(22) Filed: Mar. 27, 2019

(65) Prior Publication Data
US 2020/0309025 A1   Oct. 1, 2020

(51) Int. Cl.
*F02B 65/00* (2006.01)
*F02B 73/00* (2006.01)

(52) U.S. Cl.
CPC .............. *F02B 65/00* (2013.01); *F02B 73/00* (2013.01)

(58) Field of Classification Search
CPC ...... F02B 37/164; F02B 37/166; F02B 65/00; F02B 73/00; F02B 33/34; F02B 37/20; F02B 40/10; F02B 61/04
See application file for complete search history.

(56) References Cited

U.S. PATENT DOCUMENTS

| | | | | |
|---|---|---|---|---|
| 2,585,029 A * | 2/1952 | Nettel | ...................... | F02B 37/11 60/606 |
| 3,672,160 A * | 6/1972 | Kim | ........................ | F02B 37/16 60/604 |
| 3,676,999 A * | 7/1972 | Oldfield | ................. | F02B 37/166 60/606 |
| 3,775,971 A * | 12/1973 | Gadefelt | ................ | F02B 37/166 60/606 |
| 3,988,894 A * | 11/1976 | Melchior | ................. | F02B 37/04 60/606 |
| 4,018,053 A * | 4/1977 | Rudert | ................... | F02B 37/166 60/606 |
| 4,026,115 A * | 5/1977 | Melchior | .............. | F02B 37/166 60/614 |
| 4,215,549 A * | 8/1980 | Daeschner | ............ | F02B 37/166 239/406 |
| 4,449,370 A * | 5/1984 | Ream | .................. | B01D 53/9495 60/303 |
| 4,766,729 A * | 8/1988 | Miyajima | ............... | F02B 53/08 60/598 |
| 5,056,315 A * | 10/1991 | Jenkins | .................... | F02B 53/02 60/614 |

(Continued)

FOREIGN PATENT DOCUMENTS

GB        2283064       4/1995

*Primary Examiner* — Jesse S Bogue
(74) *Attorney, Agent, or Firm* — Norton Rose Fulbright Canada LLP

(57) ABSTRACT

There is disclosed a method of operating an engine assembly, including: driving a load with an internal combustion engine and an output of a turbine section, the turbine section driven by combustion gases from an exhaust the internal combustion engine; and injecting fuel upstream of the turbine section and downstream of the exhaust of the internal combustion engine. An engine assembly having a secondary injector for injecting fuel upstream of the turbine section and downstream of the combustion engine is also disclosed.

16 Claims, 3 Drawing Sheets

(56) References Cited

U.S. PATENT DOCUMENTS

| | | | | |
|---|---|---|---|---|
| 5,168,846 | A * | 12/1992 | Paul | F02B 55/14 |
| | | | | 123/202 |
| 5,555,730 | A * | 9/1996 | Hope | F01B 9/023 |
| | | | | 60/606 |
| 7,434,389 | B2 * | 10/2008 | Robel | B60H 1/00435 |
| | | | | 60/274 |
| 7,775,044 | B2 * | 8/2010 | Julien | F02C 3/055 |
| | | | | 60/614 |
| 8,200,413 | B2 * | 6/2012 | Brooks | F02M 21/0206 |
| | | | | 701/103 |
| 8,249,792 | B2 * | 8/2012 | Blanvillain | G05D 1/0072 |
| | | | | 701/3 |
| 9,399,521 | B2 * | 7/2016 | Swann | F02C 9/16 |
| 9,810,122 | B2 * | 11/2017 | Martin | F02B 37/105 |
| 10,119,460 | B2 * | 11/2018 | Primus | F02C 6/20 |
| 2009/0007882 | A1 * | 1/2009 | Lents | F02B 37/00 |
| | | | | 123/200 |
| 2009/0309475 | A1 * | 12/2009 | Tozzi | F02B 19/12 |
| | | | | 313/143 |
| 2011/0184623 | A1 * | 7/2011 | De Boer | B64D 31/10 |
| | | | | 701/99 |
| 2013/0025567 | A1 * | 1/2013 | Thomassin | F01C 21/183 |
| | | | | 123/209 |
| 2014/0020381 | A1 * | 1/2014 | Bolduc | F01C 11/008 |
| | | | | 60/605.1 |
| 2016/0245166 | A1 * | 8/2016 | Thomassin | F02B 41/10 |
| 2017/0267370 | A1 * | 9/2017 | Ullyott | H02K 7/1823 |

* cited by examiner

COMPOUNDED INTERNAL COMBUSTION ENGINE

TECHNICAL FIELD

The application relates generally to compounded internal combustion engines and, more particularly, to systems and methods for operating such engines.

BACKGROUND OF THE ART

A combustion engine is designed to generate a baseline power. However, in some instances, such as when one of two engines of an aircraft becomes inoperative, it might be required to increase the power of the remaining engine beyond its baseline power.

SUMMARY

In one aspect, there is provided a method of operating an engine assembly, comprising: driving a load with an internal combustion engine and an output of a turbine section, the turbine section driven by combustion gases from an exhaust the internal combustion engine; and injecting fuel upstream of the turbine section and downstream of the exhaust of the internal combustion engine.

In another aspect, there is provided a method of operating an engine assembly of an aircraft, the engine assembly having a combustion engine and a turbine section driven by exhaust gases from the internal combustion engine, the method comprising: determining that the aircraft is in a phase in which a thrust supplement is needed; and injecting fuel into the exhaust gases discharged from the combustion engine upstream of the turbine section, the turbine section is in driving engagement with the rotatable load and/or with another load.

In yet another aspect, there is provided an engine assembly comprising: an internal combustion engine having an engine shaft drivingly engaged to an output shaft; a fuel injection system having at least one primary fuel injector and at least one secondary fuel injector, an outlet of the at least one primary injector fluidly connected to at least one combustion chamber of the combustion engine; and a turbine section having an inlet fluidly connected to an exhaust of the combustion engine via an exhaust conduit, the turbine section having a turbine shaft drivingly engaged to the output shaft, wherein an outlet of the at least one secondary fuel injector is fluidly connected to the exhaust conduit between the exhaust of the combustion engine and the inlet of the turbine section.

DESCRIPTION OF THE DRAWINGS

Reference is now made to the accompanying figures in which.

DETAILED DESCRIPTION

Figure 1:
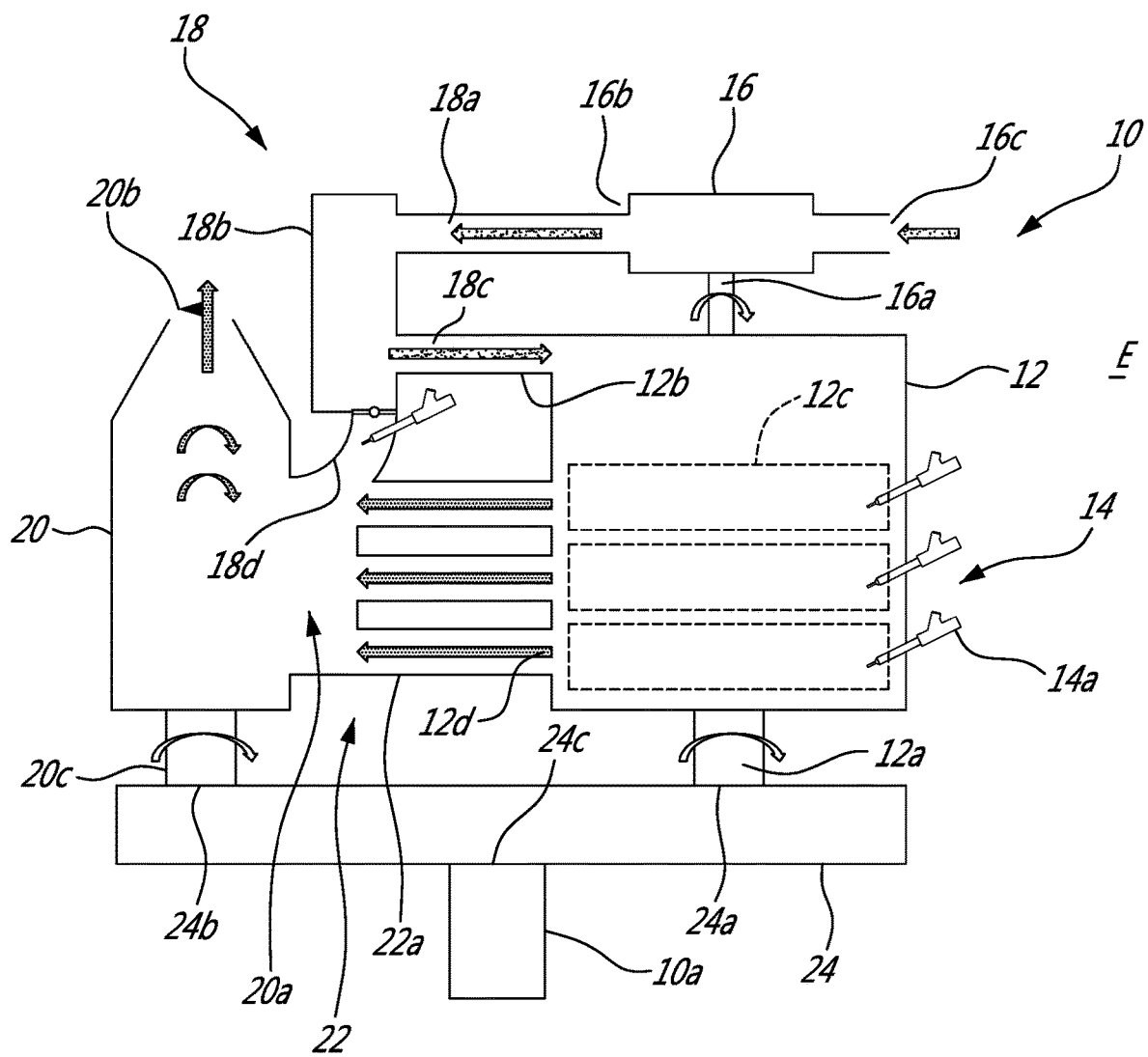
FIG. 1 is a schematic view of an engine assembly shown in a first configuration.

Referring to FIG. 1, an engine assembly is generally shown at 10. The engine assembly 10 has an output shaft 10a configured to drivingly engage a rotatable load, such as a propeller, a helicopter rotor, a generator, etc. The engine assembly 10 includes an internal combustion engine 12. The engine 12 may be a reciprocating engine, such as a piston engine. In a particular embodiment, the engine 12 is a rotary internal combustion engine as described in U.S. Pat. No. 9,353,680 granted to Villeneuve et al., the entire content of which is incorporated herein by reference.

The combustion engine 12 has an engine shaft 12a in driving engagement with the output shaft 10a of the engine assembly 10. The combustion engine 12 has an engine inlet 12b configured for receiving air required for the combustion process. The engine inlet 12b is fluidly connected to at least one combustion chamber 12c, three in the embodiment shown, of the combustion engine 12.

As illustrated in FIG. 1, the combustion engine 12 further has at least one (three in the embodiment shown) outlet 12d. Each of the outlets 12d is fluidly connected to a respective one of the combustion chamber 12c for outputting combustion gases generated therein. The combustion gasses are expelled to the environment E via the outlets 12d.

Still referring to FIG. 1, the engine assembly 10 further includes a fuel injection system 14. The fuel injection system 14 includes at least one primary injectors 14a, three in the embodiment shown. The primary injectors 14a have injector outlets 14b (FIG. 2) for outputting fuel from a fuel source, such as a fuel tank. In the depicted embodiment, each of the injector outlets 14b of the primary injectors 14a is fluidly connected to a respective one of the combustion chambers 12c of the combustion engine 12.

Still referring to FIG. 1, the engine assembly 10 further includes a compressor section 16 that has a compressor shaft 16a in driving engagement with at least one rotor (not shown) of the compressor 16. In the embodiment shown, the compressor shaft 16a is in driving engagement with the combustion engine 12. The compressor shaft 16a may be drivingly engaged directly by the engine shaft 12a, by another shaft of the engine 10, or via a gearbox.

The compressor section 16 has a compressor inlet 16c fluidly connected to an environment E outside the engine assembly 10 and a compressor outlet 16b for outputting air compressed by the compressor section 16. The compressor outlet 16b is fluidly connected to the inlet 12b of the combustion engine 12. In the embodiment shown, the compressor outlet 16b is fluidly connected to the engine inlet 12b via an air distribution system 18.

The air distribution system 18 includes a first conduit 18a, an intake plenum 18b, a second conduit 18c, and a third conduit 18d. The first conduit 18a fluidly connects the compressor outlet 16b to the intake plenum 18b. The second conduit 18c fluidly connects the intake plenum 18b to the engine inlet 12b. In other words, the compressor outlet 16b is fluidly connected to the engine inlet 12b via the intake plenum 18b and both of the first and second conduits 18a, 18c.

The engine assembly 10 further includes a turbine section 20 having a turbine inlet 20a fluidly connected to the outlets 12d of the combustion engine 10 and a turbine outlet 20b fluidly connected to the environment E outside the engine assembly 10. The turbine section 20 includes at least one turbine rotor mounted for rotation on a turbine shaft 20c.

In the embodiment shown, the engine assembly includes an exhaust assembly 22 including a plurality of exhaust conduits 22a each fluidly connecting a respective one of the outlets 12d of the combustion engine 12 to the turbine inlet 20a.

In the embodiment shown, the engine assembly 10 further includes a gearbox 24. The gearbox 24 has a first and a second inputs 24a, 24b and an output 24c. In the depicted embodiment, each of the engine shaft 12a and the turbine shaft 20c are in driving engagement with a respective one of the first and second inputs 24a, 24b of the gearbox 24. The output 24c is drivingly engaged with the output shaft 10a of the engine assembly 10. In a particular embodiment, the compressor shaft 16a is in driving engagement with the combustion engine 12 via the gearbox 24. Other configurations are contemplated.

Therefore, in the embodiment shown, both the turbine section 20 and the combustion engine 12, via their respective shafts 12a, 20c, are in driving engagement with the output shaft 10a and the rotatable load connected thereto. The turbine section 20 compounds power with the combustion engine 12 in driving the load. In other words, energy from the combustion gases generated within the combustion engine 12 is extracted and the extracted energy is used to mechanically drive the output shaft 10a. In a particular embodiment, the turbine 20 is used to drive the compressor 16.

In some cases, it might be required to get more net power at the output shaft 10a during a certain period of time. This might be achieved by adding an additional quantity of fuel directly at the exhaust ports 12d of the combustion engine 12.

Figure 2:
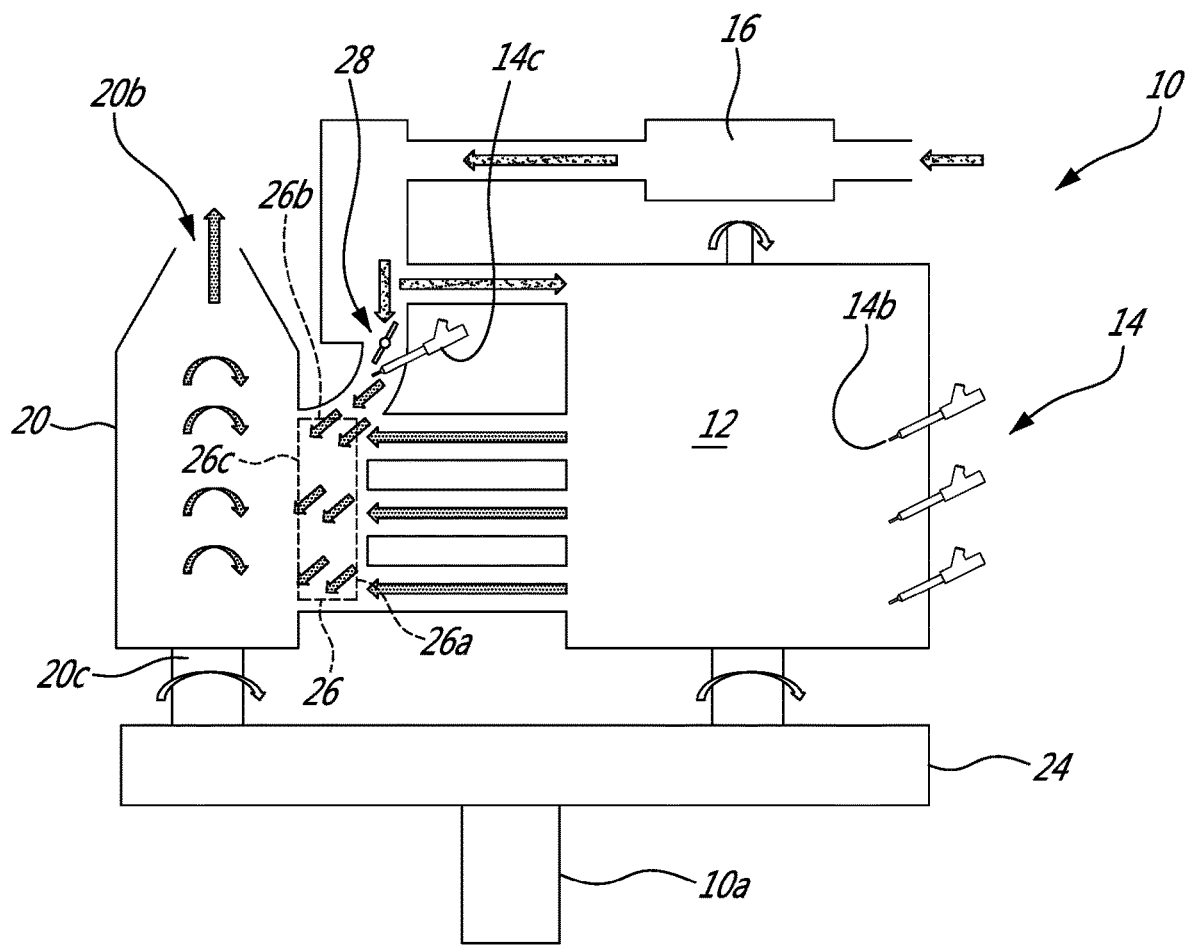
FIG. 2 is a schematic view of the engine assembly of FIG. 1 shown in a second configuration.

Referring now more particularly to FIG. 2, the fuel injection system 14 further includes at least one secondary fuel injector 14c, one being shown in this embodiment. The secondary fuel injector 14c may be identical to the primary fuel injectors 14a. As illustrated in FIG. 2, the secondary fuel injector 14c has its outlet 14b in fluid flow communication with the third conduit 18d of the air distribution system 18 and is able to inject fuel within said conduit 18d.

In the embodiment shown, the fuel is injected by the secondary injector 14c downstream of the exhausts, or outlets, 12d of the combustion engine 12 and upstream of the turbine inlet 20a. In a particular embodiment, a plurality of secondary injectors 14c are used, each having its respective outlet 14b fluidly connected to a respective one of the exhaust conduits 22a.

In the depicted embodiment, the engine assembly 10 further includes a mixing header 26 having a first header inlet 26a fluidly connected to the outlets 12d of the combustion engine 12, a second header inlet 26b fluidly connected to the third conduit 18d of the air distribution system 18, and an header outlet 26c fluidly connected to the turbine inlet 20a. The mixing header 26 is used for combining and mixing the fuel injected by the secondary injector 14c with the combustion gases generated by the combustion engine 12 and with the compressed air from the compressor 16.

In the illustrated embodiment, the engine assembly further includes a valve 28 that may be located within the third conduit 18d of the air distribution system 18. The valve 28 is operable from a first configuration (FIG. 1) in which fluid communication between the compressor 16 and the turbine section 20 is restricted to a second configuration (FIG. 2) in which the turbine section 20 is fluidly connected to the compressor 16 via the third conduit 18d. In other words, the valve 28 selectively allows compressed air from the compressor 16 to be injected in the mixing header 26 to be mixed with the fuel added by the secondary injector 14c. The secondary injector 14c may be located upstream or downstream of the valve 28. The valve 28 may be rotating valve, a linear valve actuated mechanically or electrically for a quick closing and opening. Any suitable valve may be used.

Combustion of the fuel added by the secondary injector 14c occurs upstream of the turbine inlet 20a. Consequently, the turbine section 20 might have more energy to extract from the combined combustion gases of both the combustion engine and from combustion of the added fuel. An output power of the turbine section 20 at the turbine shaft 20c may be greater when fuel is added by the secondary injector 14c than if only the combustion gases generated by the combustion engine 12 are used to drive the turbine section 20.

In a particular embodiment, a certain percentage of the extra energy resulting from combustion of the added fuel is recuperated by the turbine to give more power at the output shaft 10a of the engine assembly 10.

Figure 3:
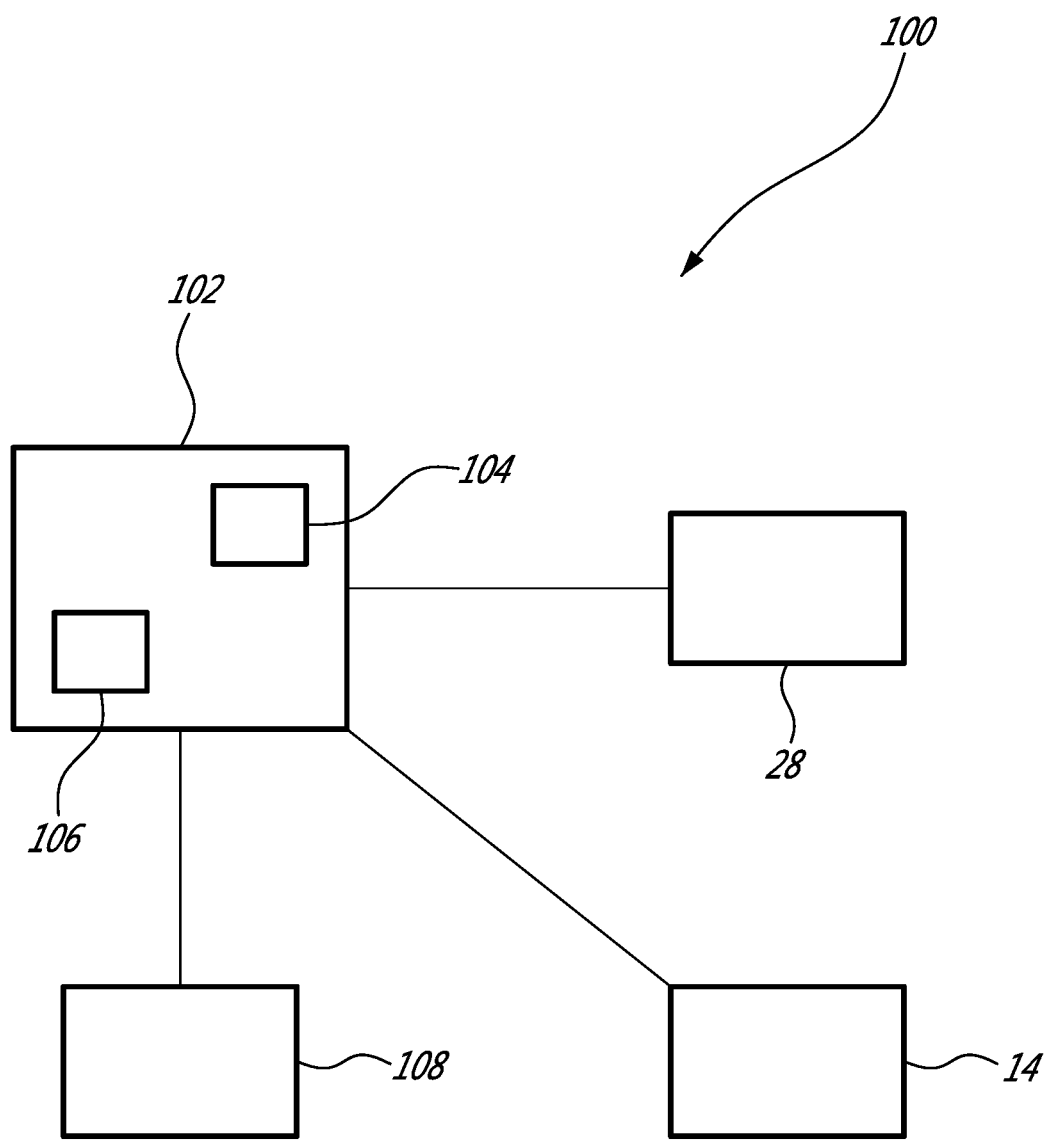
FIG. 3 is a schematic view of a control system for the engine assembly of FIG. 1.

Referring to FIG. 3, a control system for the engine assembly 10 is generally shown at 100. The control system 100 includes a controller 102 that has a processing unit 104 and a computer readable medium 106 operatively connected to the processing unit 104. The control system 100 is operatively connected to the valve 28 for controlling its opening and closing and may be operatively connected to the fuel injection system 14. The control system 100 may be operatively connected to one or more sensors 108. The sensors 108 may be used to detect a phase where more power is needed. The sensors may be, for instance, power sensors, torque sensors, gas temperature sensors. Any suitable sensors may be used.

The controller 102 may be used to modulate a flow of compressed air flowing from the compressor 16 to the mixing header 26 by controlling a position of the valve. In other words, the valve may be moved at a plurality of positions between its first and second configuration, each of the position allowing a certain amount of compressed air to pass therethrough. The controller 102 may adjust this amount of compressed air in function of the fuel added in the mixing header 26 by the one or more secondary injectors 14c. The controller 102 may control the amount of fuel injected by the fuel injection system within the mixing header 26.

In a particular embodiment, the secondary injector 14c is has the possibility to have a more constant pressure upstream of the turbine section 20 by injecting fuel a few milliseconds before or after the opening of the exhaust ports, or outlets 12d, of the combustion engine 12.

For operating the engine assembly 10, a load is driven with the internal combustion engine 12 and an output of the turbine section 20, the turbine section 20 driven by combustion gases from the exhaust 12d the internal combustion engine 12; and fuel is injected upstream of the turbine section 20 and downstream of the exhaust 12d of the internal combustion engine 12. In the embodiment shown, injecting the fuel further includes injecting compressed air upstream of the turbine section 20 and downstream of the exhaust 12d of the combustion engine 12. In the depicted embodiment, injecting the compressed air includes injecting the compressed air from the compressor 16 drivingly engaged by the combustion engine 12 and/or by the turbine section 20.

Herein, injecting the compressed air includes moving the valve 28 from a first the configuration in which fluid communication between the compressor 16 and the turbine section 20 is limited to the second configuration in which the turbine section 20 is fluidly connected to the compressor 16. Driving the common load may further include combining the rotational inputs of both the turbine section 20 and the combustion engine 12 in the gear box 24 and transmitting the combined rotational inputs to the common load.

In the embodiment shown, the combustion engine 12 has a plurality of combustion chambers 12c and injecting the fuel in the turbine section 20 may include injecting the fuel in the turbine section 20 downstream of each of the combustion chambers 12c of the combustion engine 12.

In the embodiment shown, the compressed air is mixed with the injected fuel before injecting the mixed compressed air and the injected fuel in the turbine section 20.

For operating the engine assembly 10 of an aircraft, it is determined that the aircraft is in a phase in which a thrust supplement is needed; and fuel is injected into the combustion gases discharged from the combustion engine 12 upstream of the turbine section 20 of the engine assembly 10. In the embodiment show, the turbine section is in driving engagement with the rotatable load and/or with another load. Herein, determining that the aircraft is in the phase includes determining that the aircraft is in an One-Engine-Inoperative phase. In a particular embodiment, the other load is another propeller, a generator, or any other suitable load. The other load may be a load that is not used for operating the internal combustion engine 12.

In a particular embodiment, the disclosed engine assembly 10 allows to get extra power during a certain amount of time with the same combustion engine 12 size and turbine module 20; and allows a higher power to weight ratio during that extra power period of time. In a particular embodiment, the engine assembly 10 is designed for take-off point and uses that extra power mode for special condition such as OEI (One Engine Inoperative) or other specific maneuvers.

In a particular embodiment, the inlet of the turbine section 20 is proximate the outlet, or exhaust, 12d of the internal combustion engine 12. This might facilitate the fluid connection between the turbine section and the internal combustion engine and might facilitate the adding of the secondary fuel injector 14c as described above for post burning. In a particular embodiment, having the turbine shaft 20c substantially parallel to the engine shaft 12a and having both the turbine section 20 and the internal combustion engine 12 on a same side of the gearbox 24 allows the facilitation of the connection between the turbine section 20 and the internal combustion engine 12.

In accordance with an embodiment, there is provided a pre-turbine burner upstream all the turbines, adding more potential energy for expansion and providing an improved thermodynamic cycle.

In accordance with a further aspect, the internal combustion engine 12 is a rotary engine (e.g. a Wankel type engine) having a dual injection pilot subchamber ignition. This allows to have low compression ratio in the internal combustion engine 12 and larger turbocompounding compression and expansion ratio, making the usefulness of the pre-turbine burner even more valuable and providing a more efficient thermodynamic turbine expansion.

In accordance with another aspect, all the energy available in the exhaust gases from the internal combustion engine 12 and the additional heat from the pre-turbine burner disposed downstream from the engine 12 is used to compound the power with the main internal combustion engine power to drive the load.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method of operating an engine assembly having an internal combustion engine being a rotary engine, the rotary engine having a housing defining a rotor cavity and a rotor within the rotor cavity, the housing defining a pilot subchamber communicating with the rotor cavity, the method comprising:
    injecting fuel into the pilot subchamber and igniting the injected fuel;
    driving a turbine section of the engine assembly with combustion gases generated by the rotary engine;
    driving a load with both of the rotary engine and with a shaft of the turbine section; and
    injecting fuel upstream of the turbine section and downstream of an exhaust of the rotary engine; and further comprising injecting compressed air upstream of the turbine section and downstream of the exhaust of the internal combustion engine, and wherein the injecting of the compressed air includes injecting the compressed air from a compressor drivingly engaged by the internal combustion engine and by the turbine section.

2. The method of claim 1, wherein the injecting of the fuel into the pilot subchamber includes injecting the fuel in the pilot subchamber having a volume of at least 0.5% and up to 3.5% of a displacement volume, the displacement volume being defined as a difference between the maximum and minimum volumes of a combustion chamber defined between the housing and the rotor, and/or from 5% to 25% of a combustion volume, the combustion volume being a sum of the minimum volume of the combustion chamber plus the volume of the pilot subchamber.

3. The method of claim 2, wherein injecting the compressed air includes moving a valve from a first configuration in which fluid communication between the compressor and the turbine section is restricted to a second configuration in which the turbine section is fluidly connected to the compressor.

4. The method of claim 1, wherein driving the load further includes combining rotational inputs of both the turbine section and the internal combustion engine in a gear box and transmitting the combined rotational inputs to the load.

5. The method of claim 1, wherein the internal combustion engine has a plurality of combustion chambers, injecting the fuel in the turbine section includes injecting the fuel in the turbine section downstream of each of the combustion chambers of the internal combustion engine.

6. The method of claim 2, further comprising mixing the compressed air with the injected fuel before injecting the mixed compressed air and the injected fuel in the turbine section.

7. A method of operating an engine assembly of an aircraft, the engine assembly having a rotary combustion engine driving a rotatable load and a turbine section driven by exhaust gases from the rotary combustion engine, the rotary combustion engine having a housing defining a rotor cavity and a rotor within the rotor cavity, the housing defining a pilot subchamber communicating with the rotor cavity, the method comprising:
    injecting fuel into the pilot subchamber and igniting the injected fuel;
    determining that the aircraft is in a phase in which a thrust supplement is needed; and
    injecting fuel into exhaust gases discharged from the rotary combustion engine upstream of the turbine section, the turbine section and the rotary combustion engine both in driving engagement with the rotatable load; and further comprising injecting compressed air upstream of the turbine section and downstream of the exhaust of the combustion engine, and wherein the injecting of the compressed air includes injecting the compressed air from a compressor drivingly engaged by the combustion engine and by the turbine section.

8. The method of claim 7, wherein determining that the aircraft is in the phase where a thrust supplement is needed includes determining that the aircraft is in an One-Engine-Inoperative phase.

9. The method of claim 7, further comprising mixing the compressed air with the injected fuel before injecting the mixed compressed air and the injected fuel in the turbine section.

10. The method of claim 7, wherein injecting the compressed air includes moving a valve from a first configuration in which fluid communication between the compressor and the turbine section is limited to a second configuration in which the turbine section is fluidly connected to the compressor.

11. An engine assembly comprising: an internal combustion engine having an engine shaft drivingly engaged to an output shaft, the internal combustion engine being a rotary engine, the rotary engine having a housing defining a rotor cavity and a rotor rotatable within the rotor cavity, the housing defining a pilot subchamber communicating with the rotor cavity; a fuel injection system having at least one primary fuel injector communicating with the rotor cavity, a pilot fuel injector communicating with the rotor cavity via the pilot subchamber, and at least one secondary fuel injector, an outlet of the at least one primary injector fluidly connected to at least one combustion chamber of the rotary engine; and a turbine section having an inlet fluidly connected to an exhaust of the rotary engine via an exhaust conduit, the turbine section having a turbine shaft drivingly engaged to the output shaft, wherein an outlet of the at least one secondary fuel injector is fluidly connected to the exhaust conduit between the exhaust of the rotary engine and the inlet of the turbine section; and further comprising injecting compressed air upstream of the turbine section and downstream of the exhaust of the internal combustion engine, and wherein the injecting of the compressed air includes injecting the compressed air from a compressor drivingly engaged by the internal combustion engine and by the turbine section.

12. The engine assembly of claim 11, further comprising the compressor having a compressor outlet fluidly connected to an air inlet of the combustion engine and fluidly connectable to the exhaust conduit.

13. The engine assembly of claim 12, wherein the compressor outlet is fluidly connected to the turbine inlet via a compressor conduit, the engine assembly further comprising a valve within the compressor conduit, the valve operable from a first configuration in which fluid communication between the compressor and the turbine section is limited to a second configuration in which the turbine section is fluidly connected to the compressor.

14. The engine assembly of claim 12, further comprising an intake plenum fluidly connected to the compressor outlet and fluidly connected to the air inlet of the combustion engine, the intake plenum fluidly connectable to the exhaust conduit.

15. The engine assembly of claim 11, wherein the at least one combustion chamber and the at least one secondary fuel injector include a plurality of combustion chambers and a plurality of secondary fuel injectors and wherein the exhaust conduit includes a plurality of exhaust conduits each fluidly connecting the turbine section to a respective one of the plurality of combustion chambers, each of the plurality of secondary fuel injectors fluidly connected to a respective one of the plurality of exhaust conduits.

16. The engine assembly of claim 12, further comprising a mixing header having at least two header inlets and at least one header outlet, each of the at least two header inlets fluidly connected to a respective one of the exhaust of the combustion engine and the compressor outlet, the at least one header outlet fluidly connected to the turbine inlet.

\* \* \* \* \*